(12) United States Patent
Liu (10) Patent No.: US 12,120,411 B2
(45) Date of Patent: Oct. 15, 2024

(54) MOUNT FOR WEBCAM

(71) Applicant: Magic Control Technology Corporation, New Taipei (TW)

(72) Inventor: Pei-Chung Liu, New Taipei (TW)

(73) Assignee: MAGIC CONTROL TECHNOLOGY CORPORATION, New Taipei (TW)

( * ) Notice: Subject to any disclaimer, the term of this patent is extended or adjusted under 35 U.S.C. 154(b) by 112 days.

(21) Appl. No.: 17/884,702

(22) Filed: Aug. 10, 2022

(65) Prior Publication Data

US 2023/0421874 A1 Dec. 28, 2023

(30) Foreign Application Priority Data

Jun. 22, 2022 (TW) .................................. 111123291

(51) Int. Cl.
| | |
|---|---|
| *H04N 23/54* | (2023.01) |
| *F16M 11/04* | (2006.01) |
| *F16M 11/10* | (2006.01) |
| *F16M 11/20* | (2006.01) |
| *G03B 17/56* | (2021.01) |
| *G06F 1/16* | (2006.01) |

(52) U.S. Cl.
CPC .................................. *H04N 23/54* (2023.01)

(58) Field of Classification Search
CPC ........ G06F 1/605; G06F 1/607; G06F 1/1605; G06F 1/1607; F16M 11/04; F16M 11/105; F16M 11/205; F16M 11/043; H04N 23/54; G03B 17/561; F14M 11/204
See application file for complete search history.

(56) References Cited

U.S. PATENT DOCUMENTS

| | | | |
|---|---|---|---|
| 8,475,059 B2 | 7/2013 | Khamsepoor et al. | |
| 8,593,567 B2 * | 11/2013 | Xiao ...................... | H04N 23/50 348/373 |
| 9,169,962 B2 | 10/2015 | Wang et al. | |
| 9,386,196 B1 * | 7/2016 | Fromm .................. | F16M 11/38 |
| 11,174,985 B1 | 11/2021 | Koulopoulos | |
| 11,556,147 B2 | 1/2023 | Rizvi et al. | |
| 2005/0230583 A1 | 10/2005 | Wu | |

(Continued)

FOREIGN PATENT DOCUMENTS

| | | |
|---|---|---|
| CN | 216345112 U | 4/2022 |
| CN | 216619246 U | 5/2022 |

(Continued)

OTHER PUBLICATIONS

English translation of Search report in corresponding application TW111123291 dated Jan. 4, 2023 (1 page).

(Continued)

*Primary Examiner* — Marly S Camargo
(74) *Attorney, Agent, or Firm* — Millen, White, Zelano & Branigan P.C.; Wan-Ching Montfort (57) ABSTRACT

Provided is a mount for a webcam for installing the webcam on a computer display, and the webcam set on the mount can be moved in a horizontal direction to an appropriate distance beyond the display and then rotated 90°, so that a camera lens of the webcam can be vertically oriented downward to capture an image on a table, so as to avoid capturing a part of the screen of the display, or causing the captured image distortion.

8 Claims, 10 Drawing Sheets

(56) References Cited

U.S. PATENT DOCUMENTS

| | | | |
|---|---|---|---|
| 2010/0084529 A1* | 4/2010 | Depay | F16M 11/10 |
| | | | 248/126 |
| 2010/0214469 A1* | 8/2010 | Duncan | F16M 11/28 |
| | | | 348/373 |
| 2011/0205425 A1* | 8/2011 | Duncan | F16M 11/32 |
| | | | 348/373 |
| 2012/0120236 A1 | 5/2012 | Shi-Ying | |
| 2013/0284879 A1 | 10/2013 | Low et al. | |
| 2016/0191755 A1 | 6/2016 | Fromm | |
| 2023/0240445 A1* | 8/2023 | Koutopoulos | G03B 17/561 |
| 2024/0073506 A1* | 2/2024 | Vitale | H04N 23/54 |

FOREIGN PATENT DOCUMENTS

| | | |
|---|---|---|
| TW | 423628 U | 2/2001 |
| TW | M620642 Y | 12/2021 |

OTHER PUBLICATIONS

Search report in corresponding application EP2218681.5 dated Jan. 3, 2023 (7 pages).

* cited by examiner

MOUNT FOR WEBCAM

CROSS-REFERENCE TO RELATED APPLICATION

This application claims the priority of Taiwanese patent application No. 111123291, filed on Jun. 22, 2022, which is incorporated herewith by reference.

BACKGROUND OF THE INVENTION

1. Field of the Invention

The present invention relates generally to the field of accessories for communication electronic equipment, and more particularly, to a mount for a webcam used to install the webcam on a computer display to facilitate network visual communication.

2. The Prior Arts

The use of webcams for visual communication has become a common method in the era of Internet development. Although some known computer displays have built-in cameras, the built-in cameras are all fixedly installed on the side facing the user, i.e., displaying the face of the user. The user cannot easily adjust the direction of the camera to obtain images. To solve this problem, a common choice is to purchase an additional webcam to mount on the display.

The mount for a conventional webcam has a base body for fixing on the upper side of the display, and the base body is provided with a movable base body that is rotatable, so that the webcam installed on the movable base body can, in addition to looking directly at the user, also rotate to adjust the viewing angle and the top view angle, as disclosed in related prior art documents such as U.S. Pat. Nos. 8,475,059 and 9,169,962.

Figure 1:
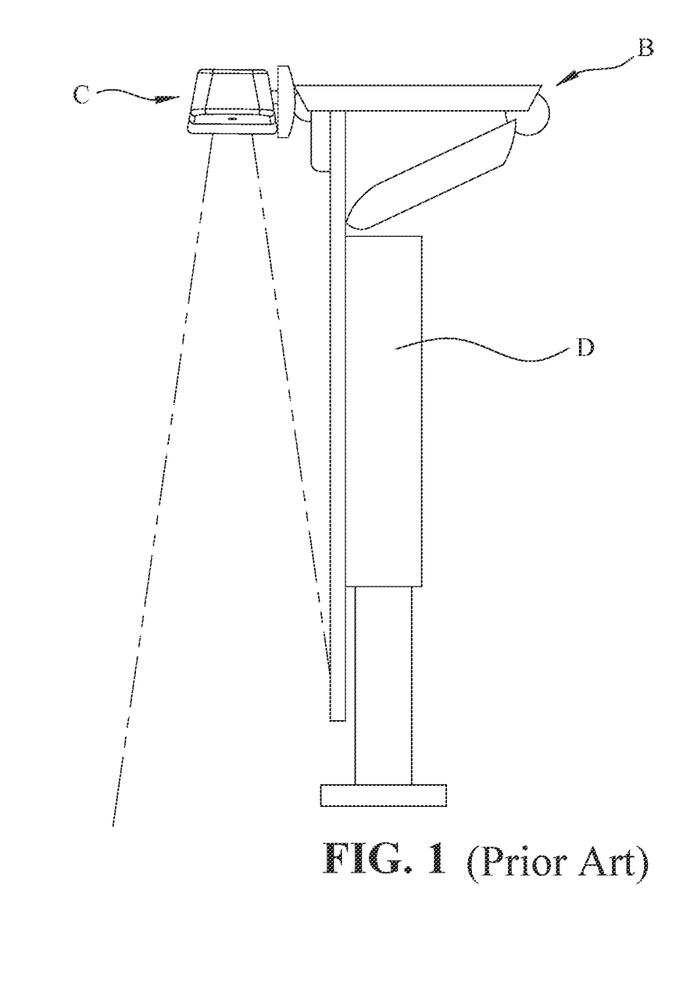
FIG. 1 is a schematic view showing the use of a conventional webcam mount mounted on a display.

As shown in FIG. 1, the mount for the conventional webcam provides the webcam with rotatability to adjust the view angles through the movable base body to obtain the target image on a table; however, when it is necessary to make the webcam directly face the documents on the table to obtain good quality images, even though the webcam can be rotated 90° by the movable base body to make the lens directly face the table, the edge of the lens of the webcam C is very close to the top of the display because the mounting of the conventional webcam at the mounting base body B is installed on the top of the display D. Therefore, when the lens of the webcam faces the table directly, the lens of the webcam will still capture a part of the screen of the display, which will affect the image quality. To avoid the above, the user must rotate the movable base body back to an appropriate angle, which results in the lens of the webcam not completely facing the table directly. As such, an included angle formed between the horizontal plane of the table and the direction of the lens will not be a right angle, thereby resulting in a trapezoidal image in the captured image, which must be corrected in post-production to obtain good quality images.

SUMMARY OF THE INVENTION

A primary objective of the present invention is to provide a mount for a webcam to solve the problems that the conventional webcam mount cannot allow the webcam to face the table directly so as to capture a part of the screen of the display, or avoid the problem of trapezoidal image when the webcam is not facing the table directly.

The present invention provides a mount for a webcam, comprising: a first base body; a second base body, rotatably connected to the first base body; and a third base body, slidably matched and assembled to the second base body, the third base body sliding relative to the second base body so that at least a part of the third base body being accommodated inside the second base body, or a part of the third base body extending out of the second base body; and a fourth base body, for connecting the webcam, the fourth base body being rotatably connected to the third base body, and the fourth base body being rotatable within the range of at least 0°-90° relative to the third base body. As such, when the target image on the table needs to be acquired directly, the third base body can slide to move the webcam away from the display, and then the fourth base body can rotate 90° to make the lens of the webcam directly facing the table to prevent the lens from capturing a part of the screen of the display.

In an embodiment of the present invention, the second base body is formed with a first notch, the opposite sides of the first notch are symmetrically formed with rails, and the opposite two outer sides of the third base body are symmetrically respectively formed with a rail groove that is slidably matched with the rail.

In an embodiment of the present invention, protruding portions are symmetrically formed on opposite sides of the first notch adjacent to the opening of the first notch, and top end of the protruding portions are lower than bottom surface of the rails; wherein, the opposite two outer sides of the third base body are respectively formed with grooves symmetrically, and the grooves are located below the rail grooves, and wherein the rails and the rail grooves are in sliding fit, in the state, the protruding portions respectively continuously contact upper surface of the groove to support the third base body. As such, when the third base body slides out of the second base body to generate an extended lever arm, a sufficient supporting effect of the second base body can be obtained.

In an embodiment of the present invention, the protruding portions are respectively connected with protruding strips parallel to the rails, and top surface of the protruding strips is lower than the top end of the protruding portion. Thereby, the structure of the second base body is strengthened.

In an embodiment of the present invention, the protruding portion is shaped as a cylinder. Thereby, when the rail groove of the third base body slides relative to the rails of the second base body, the cylindrical protrusion forms a line contact with the top surface of the groove of the third base body, thereby reducing frictional resistance during sliding.

In an embodiment of the present invention, the third base body is formed with a second notch, and two opposite outer sides of the fourth base body are respectively axially connected to opposite sides in the second notch, wherein when the rotation angle of the fourth base body relative to the third base body is 0°, the fourth base body is completely accommodated in the second notch. Thereby, the fourth base body and the third base body can be matched to form a complete shape, and the fourth base body can be rotated when the top view angle of the webcam needs to be adjusted.

In an embodiment of the present invention, the first base body and the second base body can be rotatably connected through a hinge structure.

In an embodiment of the present invention, an extension portion is formed at the open end of the second base body located at the first notch, and an included angle is formed between the extension portion and the bottom surface of the second base body, and the included angle is 90°. Thereby, the second base body having the extension part in combination with the first base body is stably placed on the upper side of the display.

In an embodiment of the present invention, the upper surface of the fourth base body is provided with a fixed shaft, and the fixed shaft is used to connect the webcam. The fixed shaft can also be rotated horizontally to adjust the viewing angle of the webcam.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 2:
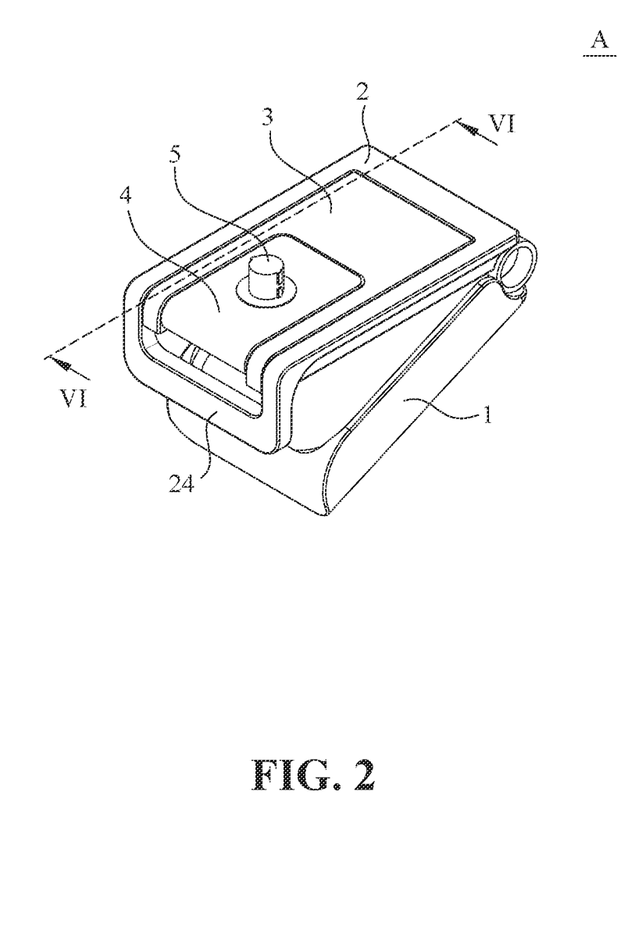
FIG. 2 is a perspective view showing the overall appearance structure of the mount for a webcam of the present invention.
Figure 3:
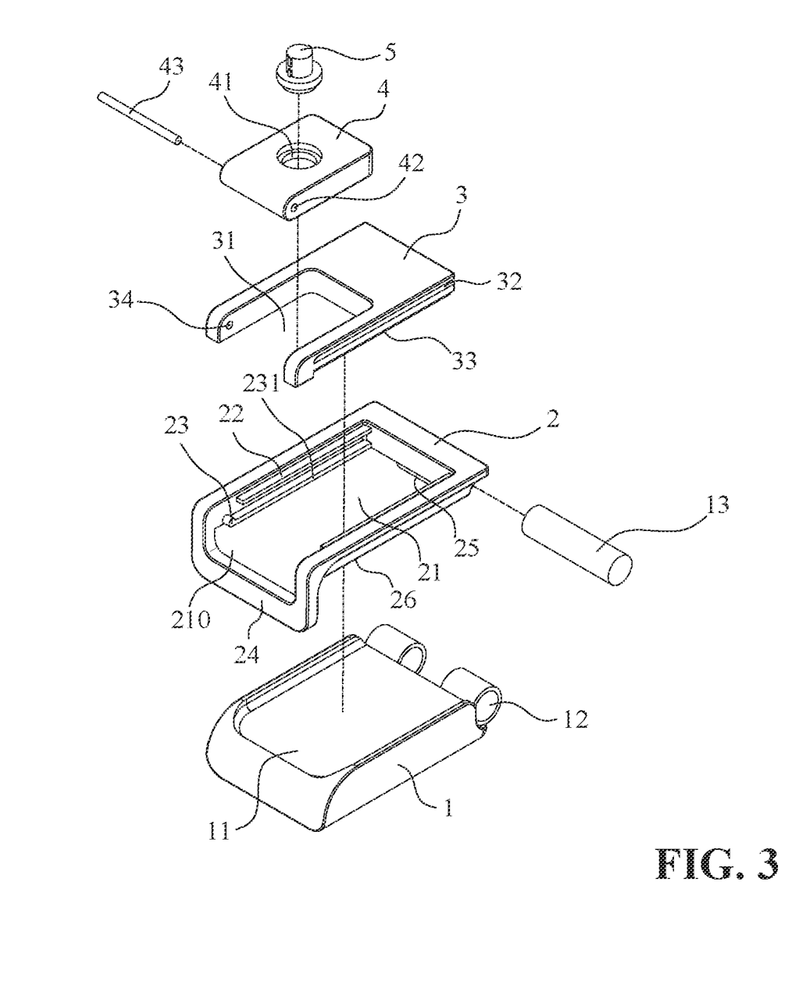
FIG. 3 is an exploded perspective view showing the assembly relationship of the main components of the mount for the webcam of the present invention.
Figure 8:
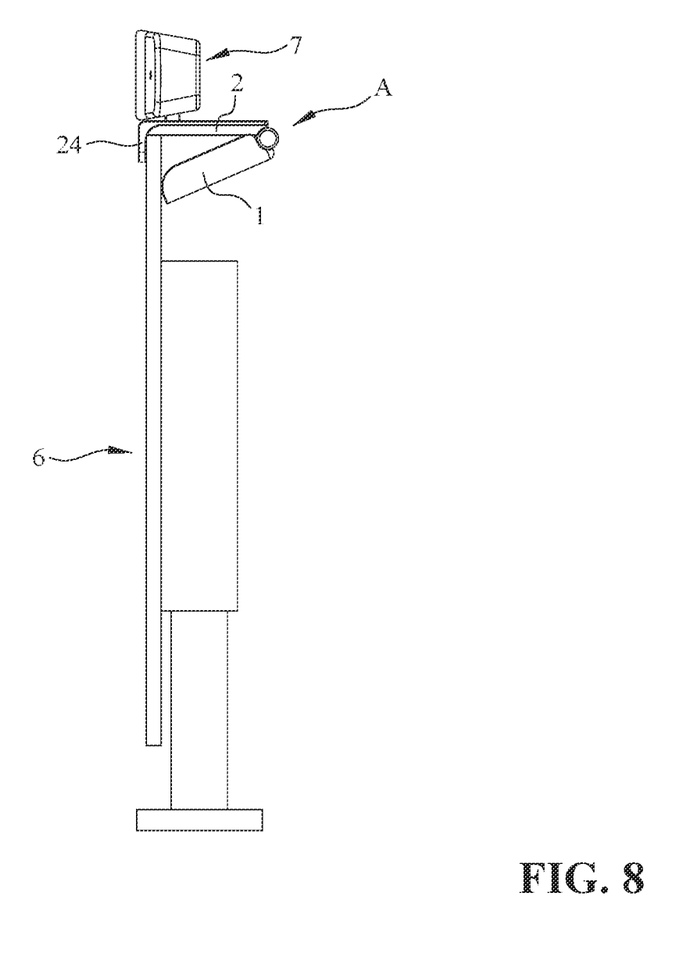
FIG. 8 is a schematic view showing the mount for the webcam of the present invention installed on the display, and the webcam installed on the mount is facing the user.

As shown in FIG. 2, FIG. 3 and FIG. 8, the embodiment of the mount A for the webcam provided by the present invention includes: a first base body 1, a second base body 2, a third base body 3, a fourth base body 4, and a fixed shaft 5; wherein, the first base body 1 is the first support element for the mount A, which is used to abut against the back of a display 6, and the upper surface of the first base body 1 can be formed with a concave portion 11 used to fit a bottom 26 of the second base body 2, and a hinge structure for rotatably connecting with the second base body 2 is provided at one end of the first base body 1, for example, one end of the first base body 1 is provided with a plurality of first pivot holes 12 spaced apart from each other and corresponding to the axial direction.

Figure 6:
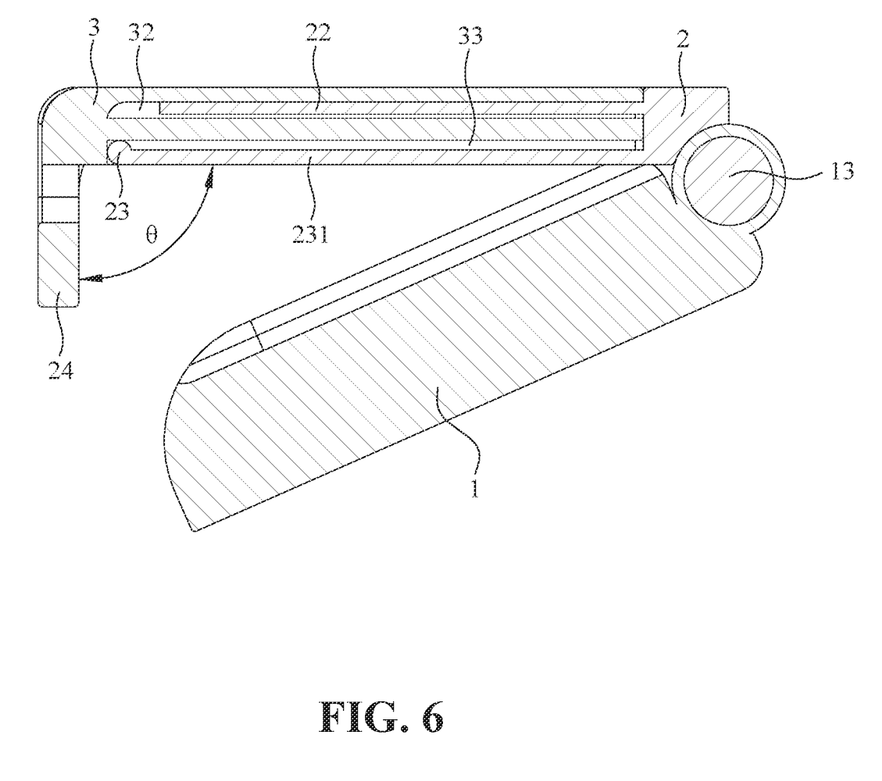
FIG. 6 is a cross-sectional view taken along line VI-VI of FIG. 2.

As shown in FIG. 3, the second base body 2 is a second supporting element for the mount A, which is rotatably connected to the first base body 1 and is used for supporting the first base body 1 on the display 6, so that the mount A is firmly seated on the display 6. More specifically, the second base body 2 is integrally formed to have a first notch 21, and an extension portion 24 forming an included angle θ with the bottom surface of the second base body 2 is formed at the open end 210 of the first notch 21 (as shown in FIG. 6). Specifically, the included angle can be formed as 90°, so that the second base body 2 is L-shaped when viewed from the side. In addition, one side of the second base body 2 is provided with a hinge structure for rotatably connecting with the first base body 1. For example, at least one second pivot hole 25 may be provided at one end of the second base body 2. The second pivot holes 25 are placed between the aforementioned two first pivot holes 12 and axially correspond to each other, and then a pivot shaft 13 passes through the first pivot hole 12 and then the second pivot hole 25 mutually axially matched to connect the ends of the first base body 1 and the second base body 2 in the same direction in a rotatably series manner. Furthermore, a horizontally extending rail 22 is symmetrically formed on opposite sides of the first notch 21 of the second base body 2, and two opposite sides of the first notch 21 adjacent to the opening 210 of the first notch 21 are respectively formed with a protruding portion 23 symmetrically, for example, the protruding portion 23 can be a cylinder, or having a cross-section to be other appropriate geometric shapes, and even the sides of each protruding portion 23 are integrally connected with protruding strips 231 in parallel with the rails 22, and the top surface of the protruding strip 231 is lower than the top end of the protruding portion 23. On the other hand, the bottom 26 of the second base body 2 is preferably formed to correspond to the shape of the concave portion 11 of the first base body 1, so that when the first base body 1 and the second base body 2 are rotated to be in a collapsed state of abutting against each other, the bottom 26 is accommodated in the concave portion 11, so that, when the mount A is not in use, the first base body 1 and the second base body 2 have a good positioning effect between the first base body 1 and the second base body 2.

Figure 4:
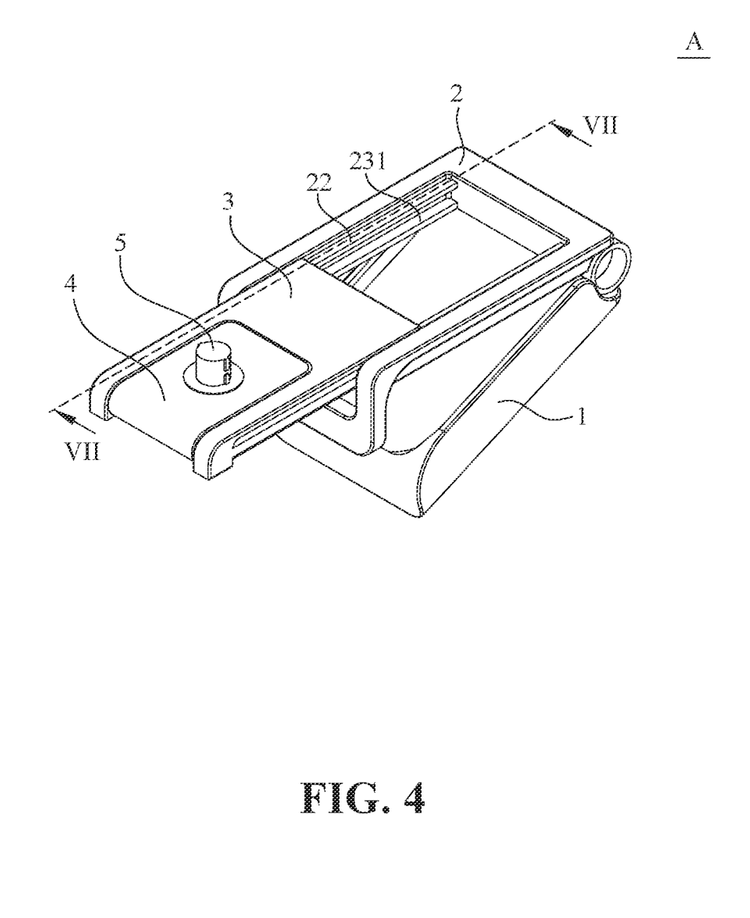
FIG. 4 is a perspective view showing an embodiment of the third base body shown in FIG. 1 sliding out of the second base body.
Figure 7:
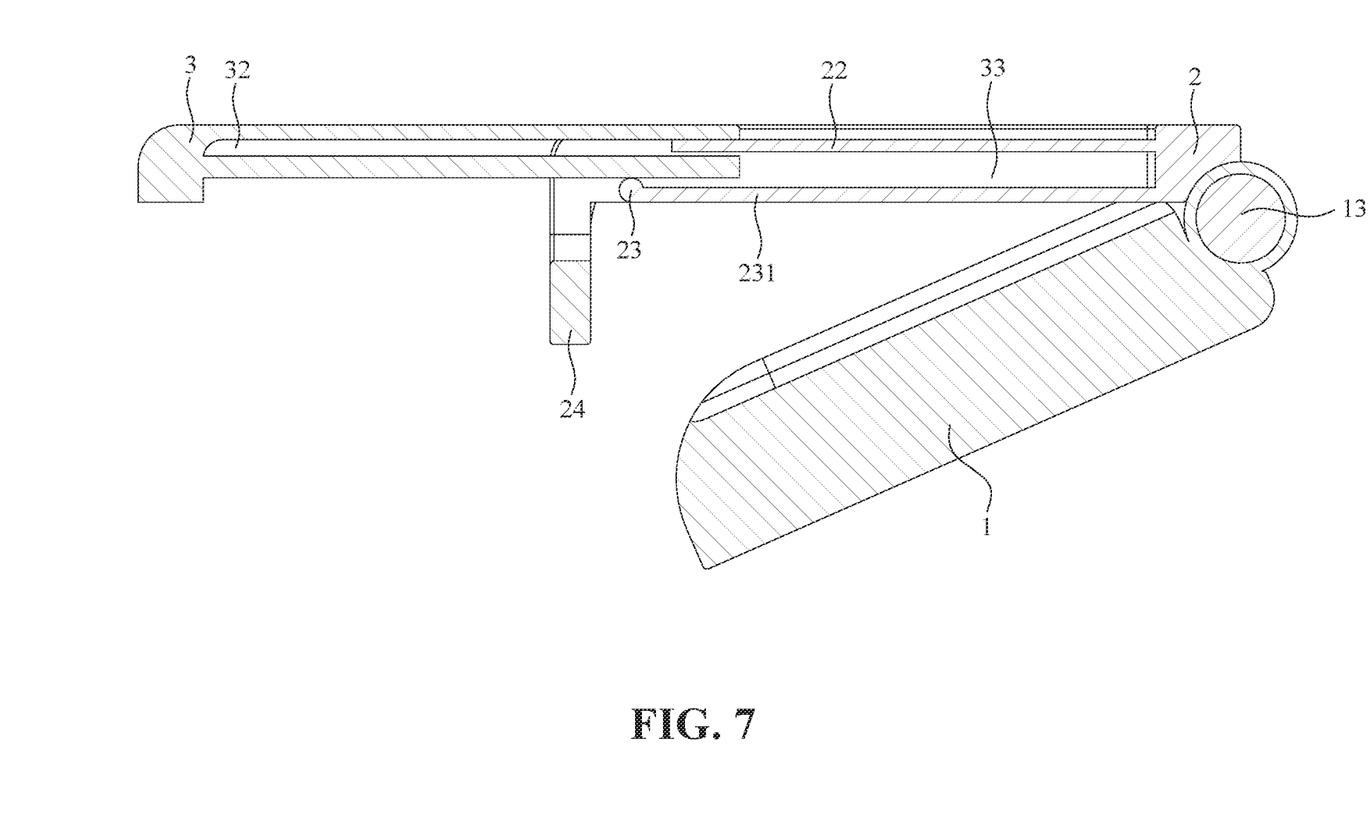
FIG. 7 is a cross-sectional view taken along line VII-VII of FIG. 4.

As shown in FIG. 3 and FIG. 4, the third base body 3 is a sliding element for the mount A, which is slidably coupled with the second base body 2, and can be slidably moved out of the second base body 2 or into the second base body 2. Specifically, two opposite outer sides of the third base body 3 are symmetrically formed with a rail groove 32 and a groove 33 parallel to the rail groove 32, and the groove 33 is located below the rail groove 32. The rail groove 32 is used to be slidably matched with the rail 22 of the second base body 2, the groove 33 is used to match with the protruding portion 23 of the second base body 2; that is, as shown in FIG. 6 and FIG. 7, through the matching of the rail groove 32 and the rail 22, the third base body 3 can slide into the first notch 21 for storage through the opening 210 of the first notch 21 of the second base body. Also, by the matching of the groove 33 and the protruding portion 23, when the third base body 3 and the second base body 2 slide relative to each other, the upper end of the protruding portion 23 is kept in contact with the top surface of the groove 33, which helps the third base body 3 to move out of the second base body 2 during sliding. When an extended lever arm is formed by the third base body 3, a stable supporting effect can be generated for the third base body 3. Furthermore, one end of the third base body 3 is formed with a second notch 31 for assembly with the fourth base body 4, and the second notch 31 is respectively provided with a concave hole 34 on two opposite sides close to the opening for rotatably connecting the fourth base body 4.

Figure 5:
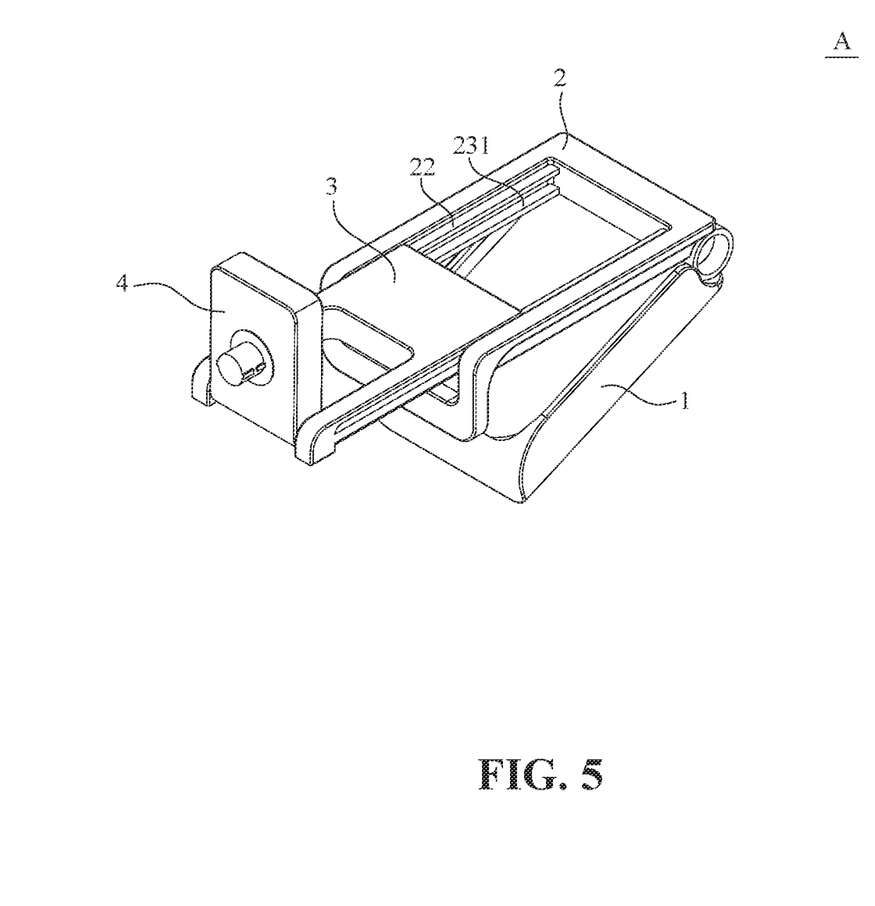
FIG. 5 is a perspective view showing an embodiment of the fourth base body shown in FIG. 4 rotated 90° relative to the third base body.

As shown in FIG. 3 and FIG. 5, the fourth base body 4 is used as a movable element of mount A, and is used in combination with the fixed shaft 5 to install the webcam. The fourth base body 4 is rotatably assembled to the second notch 31 of the third base body 3. Specifically, one end of the fourth base body 4 is provided with a through hole 42 penetrating both sides, and a rotating shaft 43 passes through the through hole 42 and makes the two ends of the rotating shaft 43 respectively match the concave holes 34 on both sides of the second notch 31 to accomplish the rotatable connection between the fourth base body 4 and the third base body 3. When the rotation angle of the fourth base body 4 relative to the third base body 3 is 0°, the fourth base body 4 is completely accommodated in the second notch 31, so that the fourth base body 4 and the third base body 3 are combined to appear as a whole. In addition, the upper surface of the fourth base body 4 can be provided with a recessed mounting portion 41, and the mounting portion 41 is used to provide the fixed shaft 5 for connecting the webcam 7 to be assembled therein. The webcam 7 connected to the fixed shaft 5 can be fastened with the fixed shaft 5, or in a relaxed state with the fixed shaft 5 so that the webcam 7 can be rotated in the horizontal direction to adjust the viewing angle of the webcam 7. The rotation of the fourth base body 4 relative to the third base body 3 can be rotated in the range of at least 0°-90°, so as to adjust the top view angle of the webcam 7 installed on the fourth base body 4.

The use of the mount A for the webcam of the present invention is described as follows:

As shown in FIG. 8, the mount A is fixed on the upper side of the display 6 by the first base body 1 and the second base body 2, that is, the second base body 2 is placed on the upper side of the display 6. The first base body 1 is against the back of the display 6, and the third base body 3 is accommodated in the second base body 2 and the webcam 7 installed in the fourth base body 4 in normal use. The lens faces the user in front of the display 6.

Figure 9:
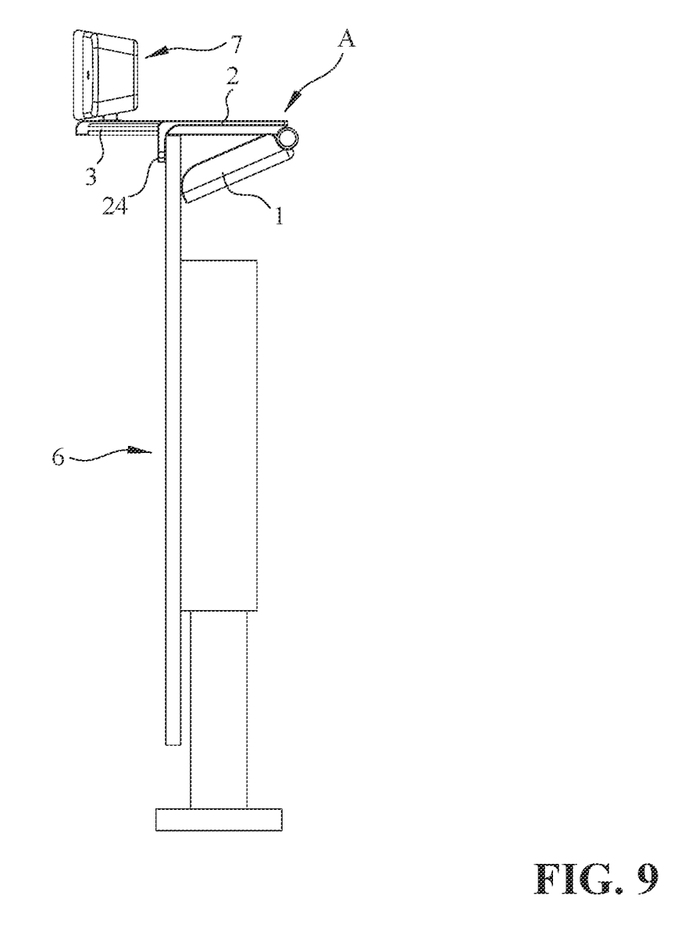
FIG. 9 shows the state in which the webcam shown in FIG. 8 is slid away from the display along with the third base body.
Figure 10:
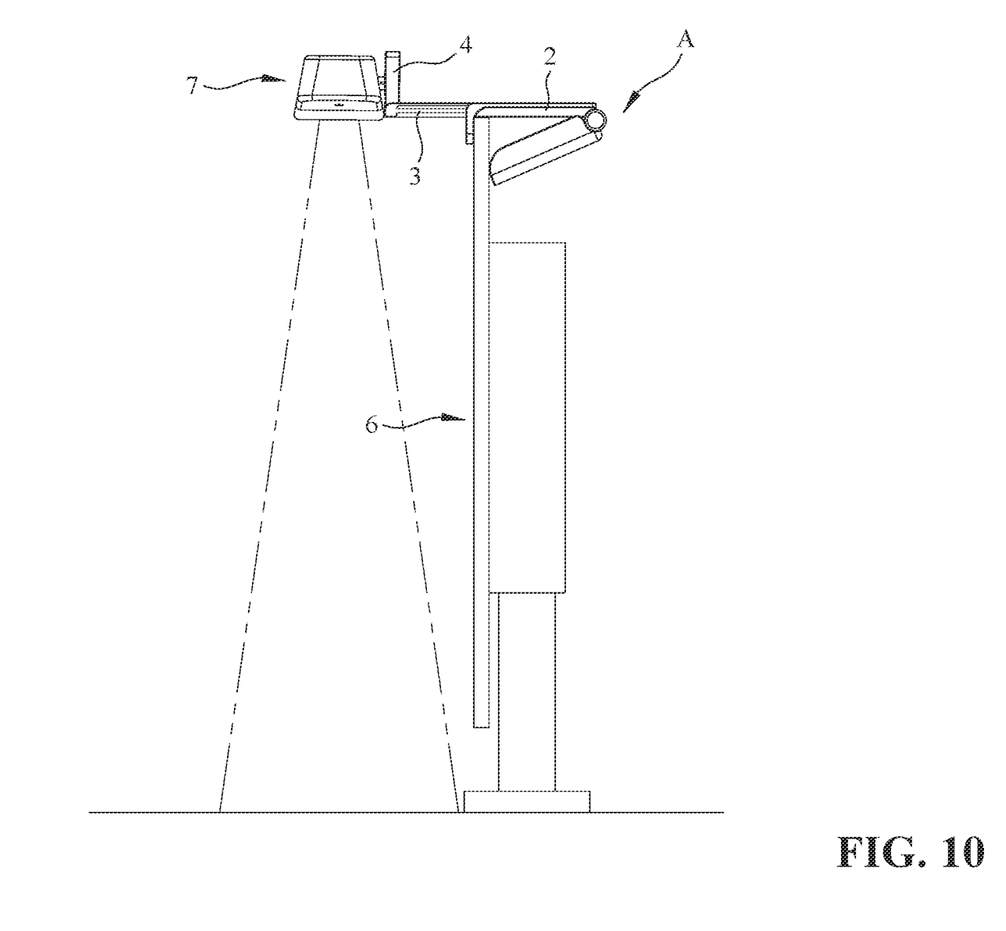
FIG. 10 shows the state after the webcam shown in FIG. 9 is rotated 90° along with the fourth base body.

When the webcam 7 needs to be turned to face the target on the table, the webcam 7 can be pulled to make the third base body 3 slide out of the second base body 2 (as shown in FIG. 9). Then, the webcam 7 will be moved downward to make the fourth base body 4 rotate 90° relative to the third base body 3 (as shown in FIG. 10). In this state, since the webcam 7 is far away from the display 6, the lens will not capture the image of the screen of the display 6 even when the lens completely face directly to the table, and it can ensure that the image captured by the webcam 7 does not produce a trapezoidal image, so subsequent image correction is not required.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A mount for a webcam, comprising:
   a first base body;
   a second base body rotatably connected to the first base body;
   a third base body slidably matched and assembled to the second base body, the third base body sliding relative to the second base body so that at least a part of the third base body is accommodated inside the second base body, or a part of the third base body extends out of the second base body; and
   a fourth base body for connecting the webcam, the fourth base body being rotatably connected to the third base body, and the fourth base body being rotatable within the range of at least 0°-90° relative to the third base body;
   wherein the second base body is formed with a first notch, opposite sides of the first notch are symmetrically respectively formed with a rail, and the opposite two outer sides of the third base body are symmetrically respectively formed with a rail groove that is slidably matched with the rail;
   wherein protruding portions are symmetrically formed on opposite sides of the first notch adjacent to an opening of the first notch, and a top end of the protruding portions are lower than a bottom surface of the rails;
   wherein the opposite two outer sides of the third base body are respectively formed with grooves symmetrically, and the grooves are located below the rail grooves, and
   wherein the rails and the rail grooves are in sliding fit, the protruding portions respectively continuously contact an upper surface of the groove to support the third base body.

2. The mount for the webcam according to claim 1, wherein the protruding portions are respectively connected with protruding strips parallel to the rails, and a top surface of the protruding strips is lower than the top end of the protruding portion.

3. The mount for the webcam according to claim 2, wherein the protruding portion is shaped as a cylinder.

4. The mount for the webcam according to claim 1, wherein the third base body is formed with a second notch, and two opposite outer sides of the fourth base body are respectively axially connected to opposite sides in the second notch, wherein when a rotation angle of the fourth base body relative to the third base body is 0°, the fourth base body is completely accommodated in the second notch.

5. The mount for the webcam according to claim 1, wherein the first base body and the second base body are rotatably connected through a hinge structure.

6. The mount for the webcam according to claim 1, wherein an extension portion is formed at an open end of the second base body located at the first notch, and an included angle is formed between the extension portion and a bottom surface of the second base body.

7. The mount for the webcam according to claim 6, wherein the included angle is 90°.

8. The mount for the webcam according to claim 6, wherein an upper surface of the fourth base body is provided with a fixed shaft, and the fixed shaft is used to connect the webcam.

* * * * *